US011124069B2

(12) United States Patent
Kaneta et al.

(10) Patent No.: US 11,124,069 B2
(45) Date of Patent: Sep. 21, 2021

(54) VEHICLE

(71) Applicant: HONDA MOTOR CO., LTD., Tokyo (JP)

(72) Inventors: Hiroyuki Kaneta, Wako (JP); Hiroshi Kurata, Wako (JP); Yoshiaki Sawano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 226 days.

(21) Appl. No.: 16/336,148

(22) PCT Filed: Sep. 27, 2016

(86) PCT No.: PCT/JP2016/078505
§ 371 (c)(1),
(2) Date: Mar. 25, 2019

(87) PCT Pub. No.: WO2018/061095
PCT Pub. Date: Apr. 5, 2018

(65) Prior Publication Data
US 2020/0023736 A1    Jan. 23, 2020

(51) Int. Cl.
*B60K 31/00* (2006.01)
*B60W 30/14* (2006.01)
*B62J 99/00* (2020.01)
*B62K 23/06* (2006.01)
*B62M 25/04* (2006.01)

(52) U.S. Cl.
CPC ............. *B60K 31/00* (2013.01); *B60W 30/14* (2013.01); *B60W 2510/081* (2013.01); *B60Y 2200/12* (2013.01); *B62J 99/00* (2013.01); *B62K 23/06* (2013.01); *B62M 25/04* (2013.01)

(58) Field of Classification Search
CPC . B60K 31/00; B60W 30/14; B60W 2510/081; B60Y 2200/12; B62J 99/00; B62K 23/06
See application file for complete search history.

(56) References Cited

U.S. PATENT DOCUMENTS 6,988,028 B2 * 1/2006 Iriyama .................. B60K 31/04
123/352
9,008,932 B2 * 4/2015 Minami ................ B60W 10/02
701/68
(Continued)

FOREIGN PATENT DOCUMENTS

JP    2002-349314    12/2002
JP    2003-327181    11/2003
(Continued)

OTHER PUBLICATIONS

International Search Report and Written Opinion for International Application No. PCT/JP2016/078505 dated Nov. 29, 2016, 11 pages.

*Primary Examiner* — Peter D Nolan
*Assistant Examiner* — Wae L Louie
(74) *Attorney, Agent, or Firm* — Amin, Turocy & Watson, LLP

(57) ABSTRACT

The abnormality determination unit of a motorcycle determines the presence or absence of abnormalities in a clutch switch and/or a cruise cancel switch on the basis of the clutch operation signal output from the clutch switch and the cruise cancel signal output from the cruise cancel switch.

3 Claims, 6 Drawing Sheets

(56) References Cited

U.S. PATENT DOCUMENTS

| | | | | |
|---|---|---|---|---|
| 10,336,329 | B2* | 7/2019 | Ohashi | B60W 30/143 |
| 2001/0032047 | A1* | 10/2001 | Shimamura | B60K 31/042 |
| | | | | 701/93 |
| 2008/0178840 | A1* | 7/2008 | Oshima | F02D 9/1065 |
| | | | | 123/349 |
| 2009/0171546 | A1* | 7/2009 | Tozuka | B60K 31/04 |
| | | | | 701/93 |
| 2009/0173562 | A1* | 7/2009 | Namari | F02D 11/105 |
| | | | | 180/179 |
| 2009/0312147 | A1* | 12/2009 | Oshima | B60K 28/10 |
| | | | | 477/110 |
| 2011/0040434 | A1* | 2/2011 | Kishibata | B60L 50/16 |
| | | | | 701/22 |
| 2014/0046563 | A1* | 2/2014 | Minami | B60W 10/02 |
| | | | | 701/68 |
| 2020/0023736 | A1* | 1/2020 | Kaneta | B60W 30/143 |

FOREIGN PATENT DOCUMENTS

| | | |
|---|---|---|
| JP | 2009-154713 | 7/2009 |
| JP | 2009-287480 | 12/2009 |
| JP | 2011-031837 | 2/2011 |

* cited by examiner

VEHICLE

TECHNICAL FIELD

The present invention relates to a vehicle including a first switch and a second switch that are pressed by the manipulation of a clutch lever arranged in front of a handle grip.

BACKGROUND ART

Japanese Laid-Open Patent Publication No. 2004-349314 discloses a vehicle in which clutch switches (first switches) are provided respectively on a clutch pedal return side (rear side of the vehicle) and a stepping side (front side of the vehicle). In this case, if each clutch switch is operating normally, each clutch switch outputs an ON signal when the clutch pedal is returning and each clutch switch outputs an OFF signal when the clutch pedal is being stepped on. Furthermore, in a case where the output relationship of each clutch switch is abnormal, the clutch pedal is judged to be malfunctioning and automatic stopping of the engine is prohibited, on a condition that automatic stop conditions independent of the clutch pedal are established.

On the other hand, a two-wheel vehicle provided with a clutch switch (first switch) that senses the manipulation of a clutch lever and is provided on the clutch lever gripping side (rear side of the two-wheel vehicle) and an auto cruise switch (second switch) for cancelling auto cruise control for holding the travelling speed constant is disclosed in Japanese Laid-Open Patent Publication No. 2009-154713, for example.

SUMMARY OF INVENTION

In a case where the technology for detecting malfunctioning of the clutch pedal disclosed in Japanese Laid-Open Patent Publication No. 2002-349314 is applied to the two-wheel vehicle including the clutch switch (first switch) and the auto cruise control switch (second switch) disclosed in Japanese Laid-Open Patent Publication No. 2009-154713, it is necessary to additionally provide a third switch for malfunction sensing. As a result, the size of the region around the handle is increased, and the cost is increased due to the increase in the number of components.

Furthermore, by providing the third switch, the arrangement of the harness in the two-wheel vehicle becomes more complicated, and the switch case including the first to third switches is prone to becoming larger and being affected by noise.

Therefore, it is an objective of the present invention to provide a vehicle that can sense abnormalities in a first switch and/or second switch with a simple and inexpensive structure.

The vehicle according to the present invention is a vehicle comprising a handle that steers a front wheel, handle grips provided at left and right ends of the handle, a clutch lever that is for manipulating a clutch and arranged in front of one of the handle grips, and a first switch and a second switch that are pressed due to manipulation of the clutch lever, and the vehicle has the following features.

First Feature: The first switch outputs a first signal caused by manipulation of the clutch lever, and the second switch outputs a second signal caused by manipulation of the clutch lever. The vehicle further comprises an ECU that controls at least two different operations, based on the first signal and the second signal. The ECU includes an abnormality determining section that determines whether there is an abnormality in the first switch and/or the second switch, based on the first signal and the second signal.

Second Feature: The first switch is a clutch switch that senses manipulation of the clutch lever, and the second switch is an auto cruise switch for cancelling auto cruise control that keeps a travelling speed constant. In this case, the first signal is a clutch manipulation signal output from the first switch in response to manipulation of the clutch lever, and the second signal is a cancel signal for cancelling the auto cruise control, is caused by manipulation of the clutch lever, and is output from the auto cruise switch.

Third Feature: A manipulation amount of the clutch lever necessary for the auto cruise switch to output the cancel signal is less than a manipulation amount of the clutch lever necessary for the clutch switch to output the clutch manipulation signal. Furthermore, the abnormality determining section determines that there is an abnormality of the clutch switch continuing in an ON state and/or an abnormality of the auto cruise switch continuing in an OFF state, when the clutch switch is in the ON state in which the clutch manipulation signal is output and the auto cruise switch is in the OFF state in which the cancel signal is not output.

Fourth Feature: The ECU further includes a startup control section that performs startup control of the vehicle based on the clutch manipulation signal and a gear position of the vehicle; an auto cruise control section that executes or dissolves the auto cruise control based on whether the cancel signal is input; and a vehicle control permission determining section that issues a request to stop performance of other control to the vehicle, if the abnormality determining section has determined that there is an abnormality in the clutch switch.

Fifth Feature: The vehicle control permission determining section issues a request to stop performance of hill start assist control or idle stop control to the vehicle, if the abnormality determining section has determined that there is an abnormality in the clutch switch.

According to the first feature of the present invention, the determination of whether there is an abnormality in the first switch and/or the second switch is made based on the signals (the first signal and the second signal) from first switch and the second switch provided to the vehicle. Due to this, it is possible to determine whether there is an abnormality in the first switch and/or the second switch using only the first signal and the second signal, without additionally providing a third switch for detecting abnormalities. Furthermore, since a third switch for detecting abnormalities is not needed, the arrangement of the harness around the handle becomes simple, and the switch case housing the first switch and the second switch can be made smaller. As a result, with the first feature, it is possible to sense an abnormality in the first switch and/or second switch with a simple and inexpensive structure, while reducing the number of components of the vehicle, and also to realize control for at least two different operations of the vehicle, based on the first signal and the second signal.

According to the second feature of the present invention, the first switch is the clutch switch that outputs the clutch manipulation signal, and the second switch is the auto cruise switch that outputs the cancel signal. Due to this, the abnormality determining section can determine whether there is an abnormality in the clutch switch and/or the auto cruise switch, using only the clutch manipulation signal and/or the cancel signal.

According to the third feature of the present invention, when the driver of the vehicle manipulates the clutch lever, during normal operation, the cancel signal Sb (ON signal indicating the ON state of the auto cruise switch) is output from the auto cruise switch in response to a small manipulation amount, and after this the clutch manipulation signal (ON signal indicating the ON state of the clutch switch) is output from the clutch switch in response to a large manipulation amount.

Therefore, when the clutch lever is manipulated by the driver, if the clutch manipulation signal is output from the clutch switch despite the cancel signal not being output from the auto cruise switch, i.e. the auto cruise switch being in the OFF state, this is a condition that cannot occur in reality, and therefore the abnormality determining section can reliably determine that an abnormality of the clutch switch remaining in the ON state and/or an abnormality of the cruise control switch remaining in the OFF state has occurred.

According to the fourth feature, if the abnormality determining section has determined that there is an abnormality in the clutch switch, a request for stopping the performance of other control is issued, and therefore and therefore it is possible to avoid a feeling of discomfort experienced by the driver when other vehicle control is performed despite there being an abnormality, and also to avoid component malfunction or the like in the vehicle relating to the other control.

According to the fifth feature, if the abnormality determining section has determined that there is an abnormality in the clutch switch, a request for stopping the performance of the hill assist control or the idle stop control, which are controls for at least two different operations in the vehicle.

In this way, it is possible to perform or prohibit three controls (auto cruise control, HSA control, and idle stop control) with just two switches, i.e. the clutch switch and the auto cruise switch. As a result, there is no need to provide a new switch for determining malfunctions in the clutch switch and the auto cruise switch, and therefore the number of components can be reduced.

Furthermore, since there is no need for a switch for determining malfunctions in the clutch switch and the auto cruise switch, the arrangement of the harness around the handle becomes simple, and it is possible to make the switch case even smaller. As a result, with the fifth feature, it is possible to sense an abnormality in the clutch switch and/or the auto cruise switch with a simple and inexpensive structure, while reducing the number of components.

Furthermore, according to the fifth feature, in the case of hill start assist control, for example, it is possible to prevent a delay in the release of the brake from when the vehicle starts moving. As a result, it is possible to make the vehicle start moving on a slope without causing a feeling of discomfort in the driver, and to prevent malfunctioning of the brake. As another example, in the case of idle stop control, it is possible to prevent continuous stopping of the engine.

DESCRIPTION OF PREFERRED EMBODIMENTS

The following describes the present invention while providing examples of preferred embodiments and referencing the accompanying drawings.

[Schematic Configuration of the Motorcycle 10]

Figure 1:
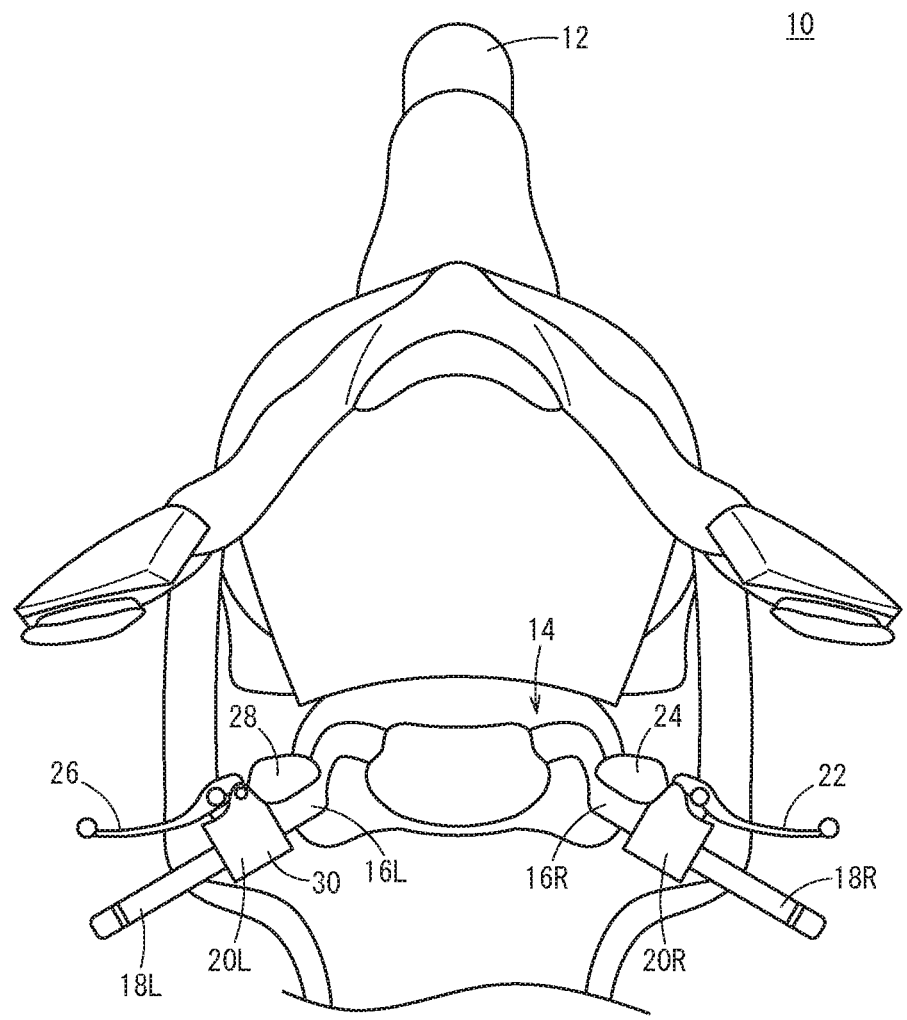
FIG. 1 is a planar view of a front portion of the motorcycle according to the present embodiment.
Figure 1:
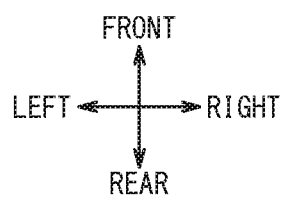

A motorcycle 10 shown in FIG. 1 is described as an example of an embodiment of the present invention. The present embodiment is not limited to the motorcycle 10, and is also capable of being applied to various vehicles such as two-wheel vehicles, three-wheel vehicles, and four-wheel vehicles that are able to perform hill start assist control (also referred to below as HSA control) and idle stop control, which are controls for at least two different operations, and in which a clutch lever, clutch switch, and auto cruise switch are arranged around the handle. Here, the HSA control refers to control for, when the motorcycle 10 begins moving on a slope, causing the brakes to operate until a startup drive force sufficient to prevent engine stoppage or backwards movement on the slope is achieved. Furthermore, in the present embodiment, the directions of front and rear, left and right, and up and down are described according to directions seen from a driver (passenger) sitting on the motorcycle 10.

As shown in FIG. 1, in the motorcycle 10, the front wheel 12, which is a steered wheel, is axially supported at the bottom ends of a left-right pair of front forks, which are not shown in the drawings. A handle 14 for steering the front wheel 12 is secured to the top ends of the front forks.

The handle 14 includes a left-right pair of handle bars 16L and 16R for steering the front wheel 12. Handle grips 18L and 18R that are formed by cylindrical rubber or the like and gripped by the driver are attached respectively to the handle bar 16L and 16R. Handle switches 20L and 20R including manipulation switches for manipulating various pieces of electrical equipment of the motorcycle 10 are attached respectively to the handle bars 16L and 16R.

In the right-side handle bar 16R, a front wheel brake lever 22 is arranged in front of the handle grip 18R, and a reserve tank 24 that stores hydraulic fluid of a hydraulic brake system is attached to a base portion of the front wheel brake lever 22. The right-side handle grip 18R is axially supported to be pivotable about an axial line of the handle bar 16R, and is configured to manipulate a throttle mechanism according to this pivoting manipulation. The handle switch 20R is equipped with various switches such as a running mode switching switch, an engine stop switch, a neutral/drive (N/D) switching switch, and a start switch.

On the other hand, in the left-side handle bar 16L, a clutch lever 26 is arranged in front of the handle grip 18L, and a clutch master cylinder 28 that outputs hydraulic pressure to the clutch (not shown in the drawing) in response to the manipulation of the clutch lever 26 by the driver is arranged on the base portion of the clutch lever 26.

(Configuration Around the Handle Bar 16L)

Figure 2:
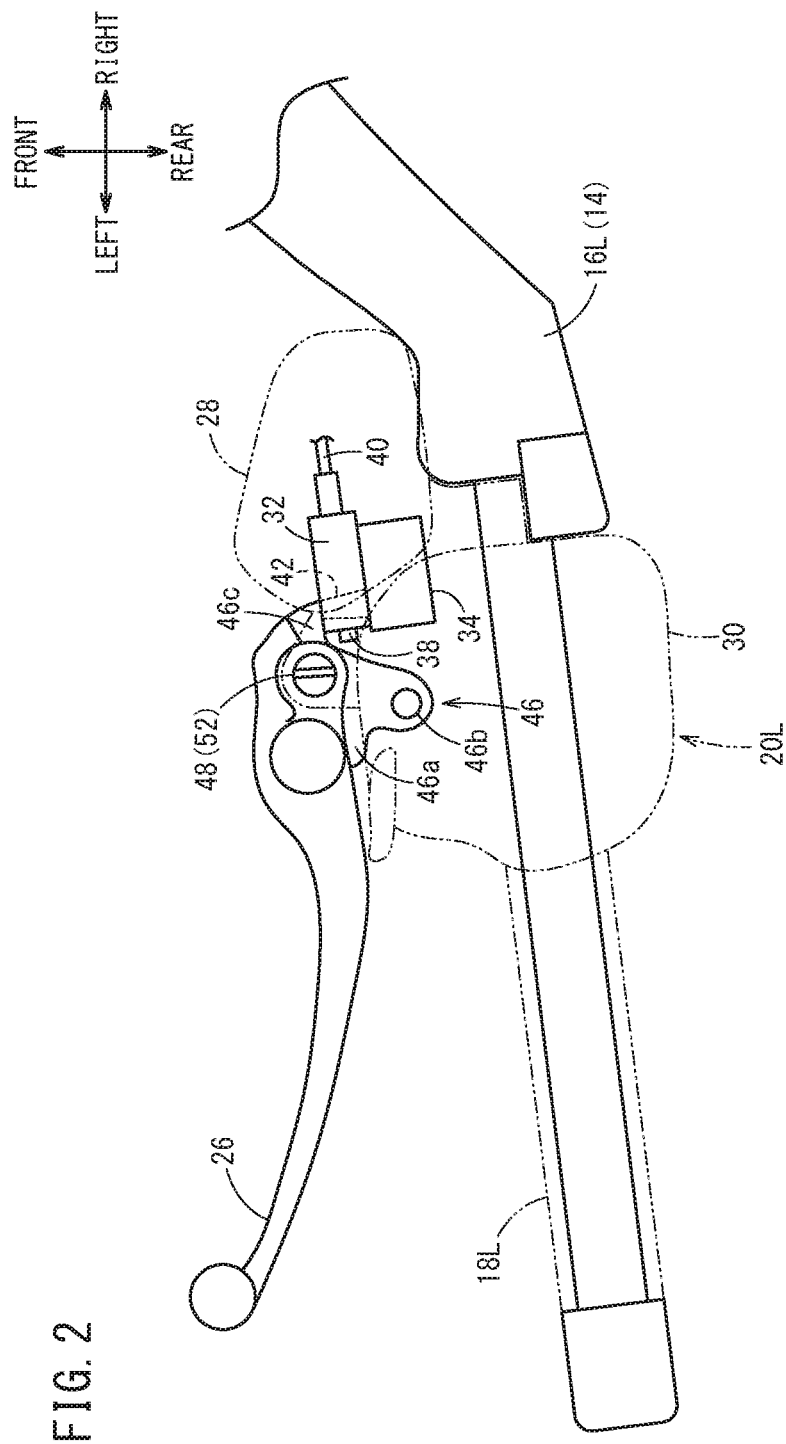
FIG. 2 is an enlarged planar view of the region around the left-side handle bar of FIG. 1.
Figure 3:
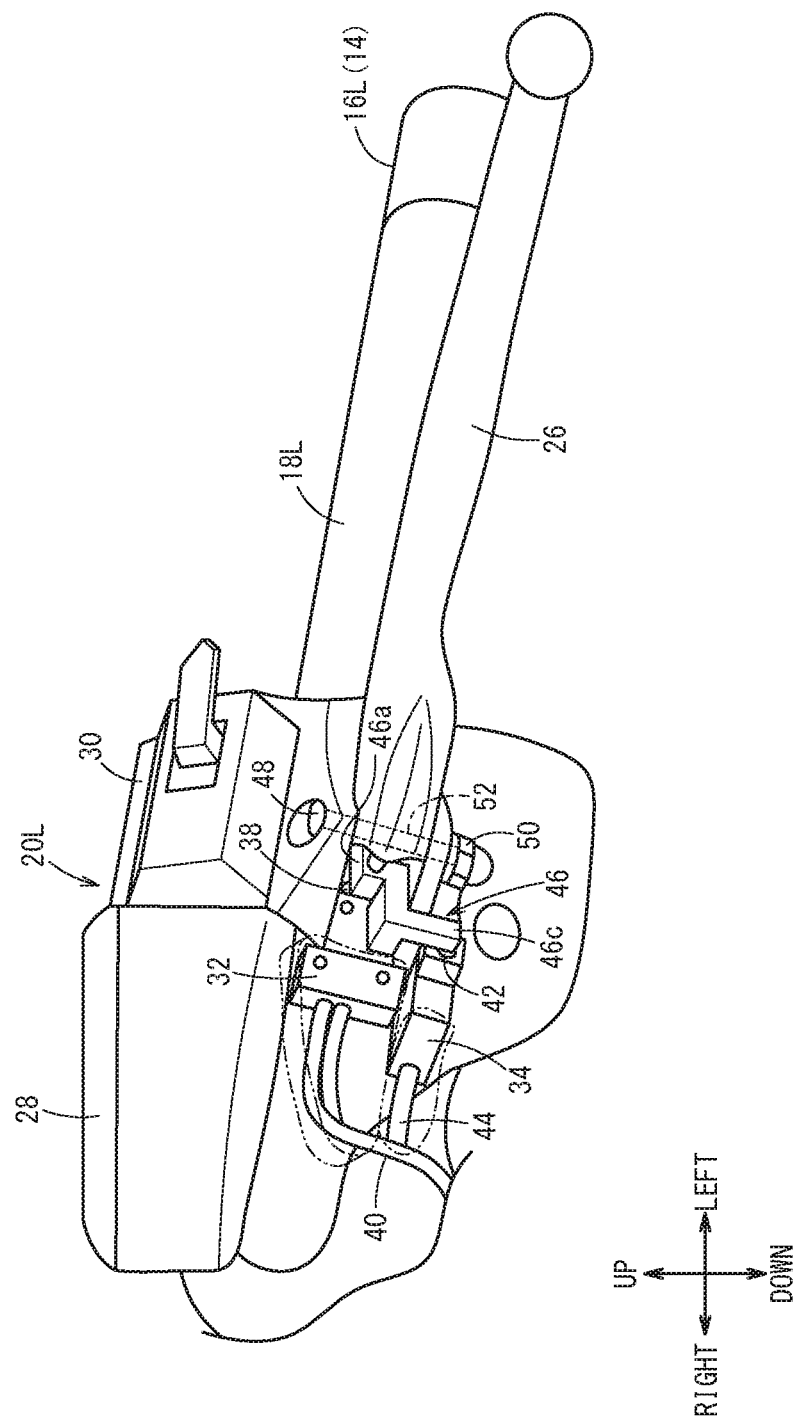
FIG. 3 is a perspective view seen from the front of the region around the left-side handle bar of FIG. 1.

Here, the configuration around the left-side handle bar 16L is described while referencing FIG. 1 to FIG. 4C. FIG. 2 and FIG. 3 are respectively a planar view and a perspective view of the left-side handle bar 16L, with a portion of the configuration omitted.

The handle switch 20L, which is attached to the base portion of the handle grip 18L on the handle bar 16L, includes a switch case 30 made of resin. The clutch lever 26 is axially supported on the front side of the switch case 30, and the clutch master cylinder 28 is secured to the front side of the switch case 30. Manipulation switches for manipulating the various pieces of electrical equipment are housed in the switch case 30.

For example, a clutch switch 32 (first switch) that outputs a signal caused by the manipulation of the clutch lever 26 by the driver and a cruise cancel switch 34 (second switch, auto cruise switch) are housed at a location near the clutch lever 26 inside the switch case 30. The clutch switch 32 outputs a clutch manipulation signal Sa (first signal) corresponding to a manipulation of the clutch lever 26 by the driver, i.e. a manipulation of cutting off the connection with the clutch. The cruise cancel switch 34 outputs a cruise cancel signal Sb (second signal) for cancelling the auto cruise control of the motorcycle 10, caused by the manipulation of the clutch lever 26.

Here, auto cruise control refers to control for keeping the travelling speed of the motorcycle 10 constant. Furthermore, the switch that outputs the cruise cancel signal Sb is provided near the handle grips 18L and 18R, near the front wheel brake lever 22, or near a brake pedal (not shown in the drawings), in addition to the cruise cancel switch 34 near the clutch lever 26.

A portion of the clutch switch 32 overlaps with a portion of the cruise cancel switch 34 in the planar view of FIG. 2, and as shown in FIG. 3, the clutch switch 32 and the cruise cancel switch 34 are stored inside the switch case 30 such that the clutch switch 32 is on top and the cruise cancel switch 34 is on the bottom.

The clutch switch 32 and the cruise cancel switch 34 are push-button types of switches.

In other words, the clutch push button 38 is arranged on the left-side surface of the clutch switch 32. The clutch switch 32 outputs the clutch manipulation signal Sa to the outside via the cable 40, while the clutch push button 38 is being pushed. In other words, the clutch switch 32 is an "a" contact type of push-button switch that outputs the clutch manipulation signal Sa as an ON signal indicating that the clutch switch 32 is in the ON state, when the clutch push button 38 is being pushed.

On the other hand, a cruise cancel push button 42 is arranged on the front surface of the cruise cancel switch 34. The cruise cancel switch 34 outputs the cruise cancel signal Sb to the outside via a cable 44, when the cruise cancel push button 42 is not being pushed. In other words, the cruise cancel switch 34 is a "b" contact type of push-button switch that outputs, when the cruise cancel push button 42 is not being pushed, the cruise cancel signal Sb as an ON signal indicating that the cruise cancel switch 34 is in the ON state.

A plate 46 is sandwiched by the base end portions of the clutch lever 26. The plate 46 is formed from a board-shaped base end portion 46a sandwiched in the clutch lever 26, a first protruding portion 46b extending backward from the base end portion 46a, and a second protruding portion 46c protruding to the right from the base end portion 46a and extending downward. The base end portion of the clutch lever 26 and the base end portion 46a of the plate 46 are secured to and axially supported by the front side of the switch case 30, by a screw member 48 and a nut 50.

As a result, an axis 52 extending in the up-down direction is formed by the screw member 48 and the nut 50, and the clutch lever 26 and plate 46 are axially supported about this axis 52. In this case, the first protruding portion 46b is formed at a position opposite the clutch push button 38, and the portion of the second protruding portion 46c extending downward is formed at a position opposite the cruise cancel push button 42.

Figure 4A:
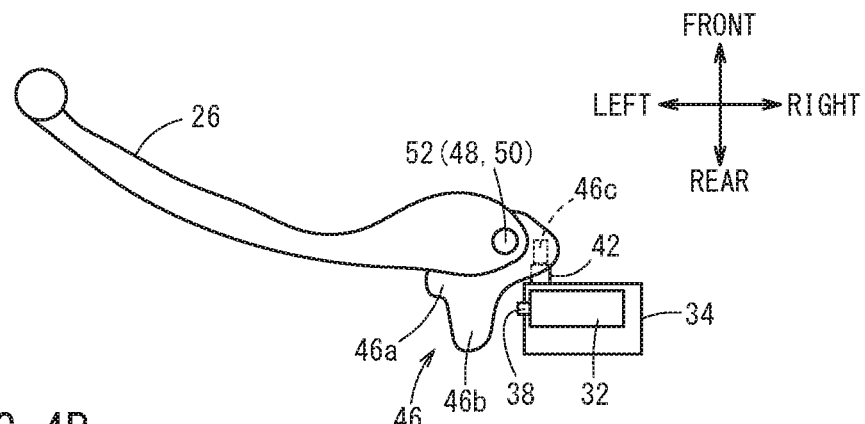
FIGS. 4A, 4B and 4C are schematic planar views showing the plate contacting the clutch switch and the cruise cancel switch, according to the manipulation of the clutch lever.
Figure 4B:
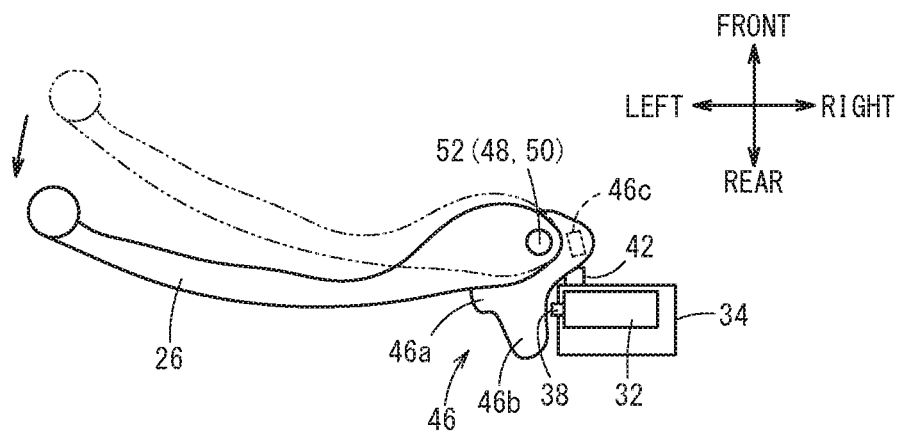
Figure 4C:
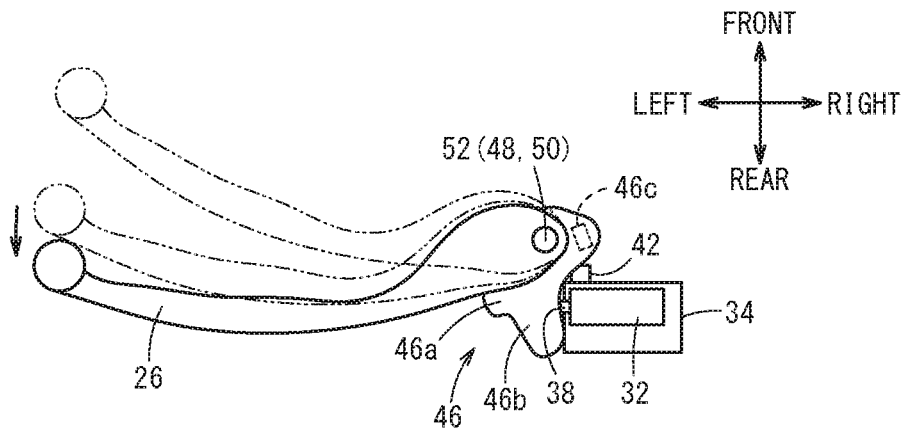

When the driver grasps the clutch lever 26 and the handle grip 18L with the left hand and pulls the clutch lever 26 backward, the clutch lever 26 and the plate 46 pivot in a counter-clockwise direction about the axis 52, in order as shown in FIG. 4A to FIG. 4C.

Here, FIG. 2 to FIG. 4A show the initial positions of the clutch lever 26 and the plate 46, i.e. a state before the driver pulls the clutch lever 26 backward. In this case, the downward-extending portion of the second protruding portion 46c of the plate 46 contacts the cruise cancel push button 42. Therefore, the cruise cancel signal Sb is not output from the cruise cancel switch 34. On the other hand, the first protruding portion 46b is distanced from the clutch push button 38, and the clutch push button 38 is not being pressed. Therefore, the clutch manipulation signal Sa is not output from the clutch switch 32. Accordingly, at the initial positions shown in FIG. 4A, the clutch switch 32 and the cruise cancel switch 34 are both in the OFF state.

Next, when the driver pulls the clutch lever 26 slightly backward while gripping the clutch lever 26 and the handle grip 18L, the clutch lever 26 and the plate 46 pivot slightly in the counter-clockwise direction about the axis 52, as shown in FIG. 4B. Due to this, the downward-extending portion of the second protruding portion 46c moves away from the cruise cancel push button 42. As a result, the cruise cancel push button 42 is released from the pressed state, thereby causing the cruise cancel switch 34 to start outputting the cruise cancel signal Sb. On the other hand, since the manipulation amount of the clutch lever 26 is small, the first protruding portion 46b remains in a state of being separated from the clutch push button 38. Accordingly, in this case as well, the clutch manipulation signal Sa is not output from the clutch switch 32. Accordingly, in the case of FIG. 4B, the clutch switch 32 is kept in the OFF state, while the cruise cancel switch 34 is switched from the OFF state to the ON state.

Next, when the driver pulls the clutch lever 26 farther backward from the state shown in FIG. 4B, the clutch lever 26 and the plate 46 pivot a large amount in the counter-clockwise direction about the axis 52 as shown in FIG. 4C. Due to this, the downward-extending portion of the second protruding portion 46c moves farther away from the cruise cancel push button 42 and the first protruding portion 46b contacts the clutch push button 38. Therefore, due to the clutch push button 38 being in the pressed state, the clutch switch 32 starts to output the clutch manipulation signal Sa instructing that the clutch connection be cut off. In this case as well, since the second protruding portion 46c is separated from the cruise cancel push button 42, the cruise cancel switch 34 continues outputting the cruise cancel signal Sb. Accordingly, in the state shown in FIG. 4C, the clutch switch 32 and the cruise cancel switch 34 are both in the ON state.

(Configuration for Sensing Abnormalities in each Switch)

Figure 5:
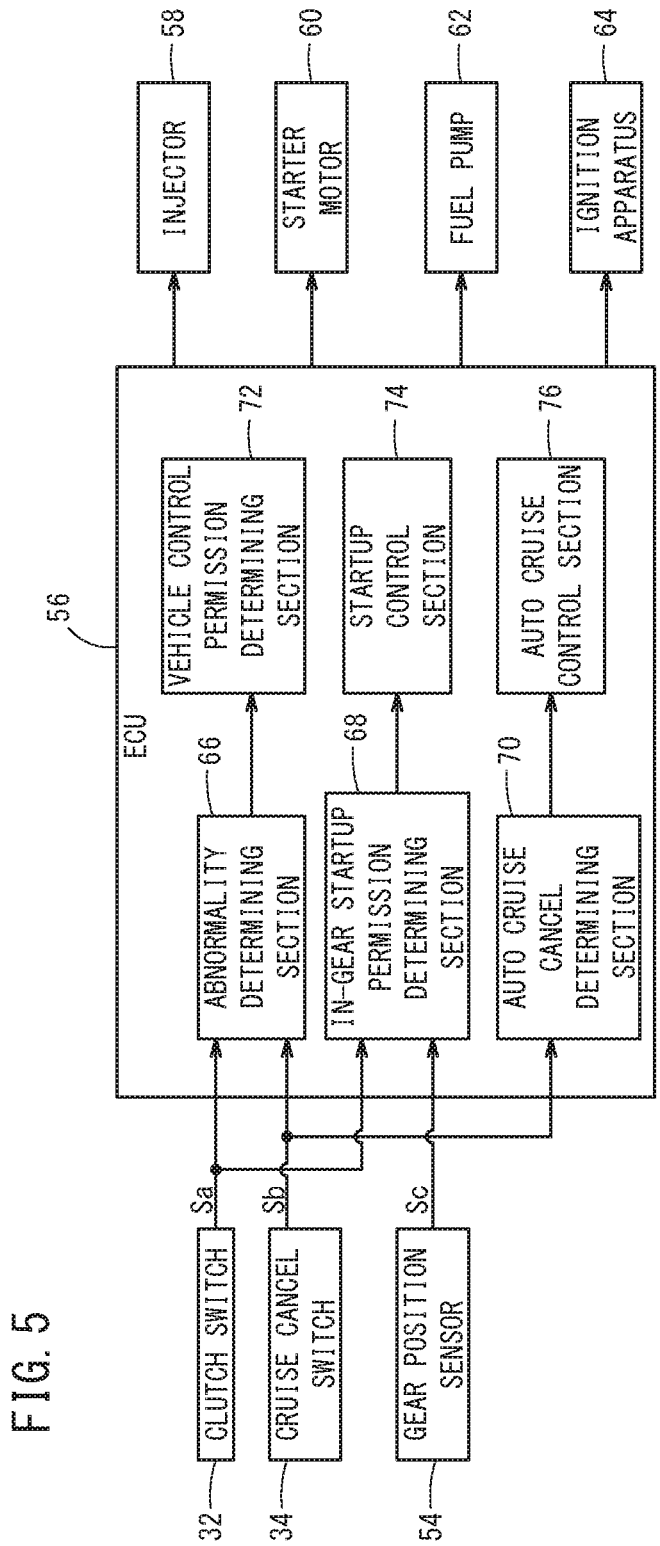
FIG. 5 is a block diagram of the motorcycle of FIG. 1.

The above describes a case in which the clutch switch 32 and/or the cruise cancel switch 34 are normal. The following describes a configuration for sensing an abnormality, such as a malfunction, when this abnormality occurs in the clutch switch 32 and/or the cruise cancel switch 34, with reference to FIG. 5.

The motorcycle 10 includes, in addition to the clutch switch 32 and the cruise cancel switch 34 described above, a gear position sensor 54 that senses a shift position, an ECU 56, an injector 58, a starter motor 60, a fuel pump 62, an ignition apparatus 64, and the like.

The ECU 56 includes an abnormality determining section 66, an in-gear startup permission determining section 68, an auto cruise cancel determining section 70, a vehicle control permission determining section 72, a startup control section 74, and a cruise control section 76.

The abnormality determining section 66 determines whether there is an abnormality in the clutch switch 32 and/or the cruise cancel switch 34, based on the clutch manipulation signal Sa output from the clutch switch 32 and the cruise cancel signal Sb output from the cruise cancel switch 34. The process for determining whether there is an abnormality in the clutch switch 32 and/or the cruise cancel switch 34 is described further below.

The in-gear startup permission determining section 68 determines whether to start up the motorcycle 10, based on the clutch manipulation signal Sa and a gear position signal Sc indicating a shift position output from the gear position sensor 54. In this case, if the clutch manipulation signal Sa is input and the shift position indicated by the gear position signal Sc is a neutral position, the in-gear startup permission determining section 68 determines that engine startup control is allowed.

The auto cruise cancel determining section 70 determines whether the auto cruise control is to be cancelled, based on the cruise cancel signal Sb. In this case, if the cruise cancel signal Sb is input, the auto cruise cancel determining section 70 determines cancellation of the auto cruise control.

When the abnormality determining section 66 has determined that some kind of abnormality has occurred in the clutch switch 32, the vehicle control permission determining section 72 issues a performance stop request for prescribed control (other control) in the motorcycle 10, specifically the HSA control or the idle stop control, based on this determination result.

If the in-gear startup permission determining section 68 has determined that engine startup control is allowed, the startup control section 74 starts up the engine, based on this determination result. In other words, the startup control section 74 rotates the starter motor 60 to start up a power unit (not shown in the drawings), controls the fuel pump 62 to supply fuel to the injector 58 from the fuel tank, controls the injector 58 to start the injection of the fuel, and controls the ignition apparatus 64 to cause ignition within the combustion chamber at a prescribed timing, thereby starting up the engine.

The cruise control section 76 stops the auto cruise control that is currently being performed, according to the determination result of cancellation of the auto cruise control by the auto cruise cancel determining section 70.

(Determination Process of the Abnormality Determining Section 66)

Figure 6:
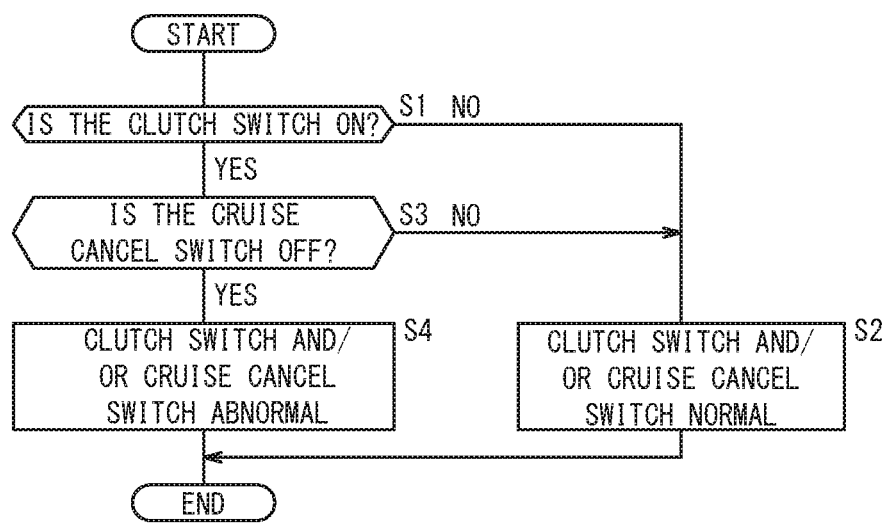
FIG. 6 is a flow chart of the determination process performed by the abnormality determining section of FIG. 5.

The following describes the abnormality determination process performed on the clutch switch 32 by the abnormality determining section 66, with reference to the flow chart of FIG. 6.

First, at step S1, the abnormality determining section 66 determines whether the clutch switch 32 is in the ON state, i.e. whether the clutch manipulation signal Sa from the clutch switch 32 is being input.

If the clutch manipulation signal Sa from the clutch switch 32 is not being input (step S1: NO), the abnormality determining section 66 then, at step S2, determines that the clutch switch 32 and/or the cruise cancel switch 34 are normal. In other words, if the clutch manipulation signal Sa is not being input, the abnormality determining section 66 determines that the clutch lever 26 is at the initial position, as shown in FIG. 4A, or that the manipulation amount of the clutch lever 26 is small and the clutch push button 38 is not being pressed by the first protruding portion 46b, as shown in FIG. 4B. In other words, if the determination result at step S1 is negative, then either there is the case (state shown in FIG. 4A) where the clutch switch 32 and the cruise cancel switch 34 are both in the OFF state or the case (state shown in FIG. 4B) where the clutch switch 32 is in the OFF state and the cruise cancel switch 34 is in the ON state, both of which are normal states.

On the other hand, at step S1, if the clutch manipulation signal Sa from the clutch switch 32 is being input (step S1: YES), the abnormality determining section 66 then, at step S3, determines whether the cruise cancel switch 34 is in the OFF state, i.e. whether the input of the cruise cancel signal Sb from the cruise cancel switch 34 has stopped.

If the cruise cancel signal Sb from the cruise cancel switch 34 is being input (step S3: NO), the abnormality determining section 66 then, at step S2, determines that the clutch switch 32 and the cruise cancel switch 34 are normal. In other words, if the clutch manipulation signal Sa is being input (step S1: YES) and the cruise cancel signal Sb is being input (step S3: NO), the abnormality determining section 66 determines that there is a state in which, since the manipulation amount of the clutch lever 26 shown in FIG. 4C is large, the cruise cancel push button 42 is not being pressed by the second protruding portion 46c and the clutch push button 38 is being pressed by the first protruding portion 46b. In other words, if the determination result at step S3 is negative, the clutch switch 32 and the cruise cancel switch 34 are both in the ON state, which is a normal state (the state of FIG. 4C).

On the other hand, if the cruise cancel signal Sb from the cruise cancel switch 34 is not being input (step S3: YES), the abnormality determining section 66 then, at step S4, determines that an abnormality such as a malfunction has occurred in the clutch switch 32 and/or the cruise cancel switch 34. In other words, if the cruise cancel signal Sb is not being input (step S3: YES) despite the clutch manipulation signal Sa being input (step S1: YES), this state clearly differs from the normal states shown in FIG. 4A to FIG. 4C, and this is because there are contradictory events that cannot occur in reality.

[Effect of the Present Embodiment]

As described above, according to the motorcycle 10 of the present embodiment, the abnormality determining section 66 determines whether there is an abnormality in the clutch switch 32 and/or cruise cancel switch 34, based on the signals (the clutch manipulation signal Sa and cruise cancel signal Sb) from the clutch switch 32 and the cruise cancel switch 34 provided to the motorcycle 10. Due to this, it is possible to determine whether there is an abnormality in the clutch switch 32 and/or the cruise cancel switch 34 without providing a new clutch switch for sensing a malfunction, using only the clutch manipulation signal Sa and the cruise cancel signal Sb. Furthermore, since there is no need for a clutch switch for sensing a malfunction, the arrangement of the harness around the handle 14 becomes simple, and it is possible to make the switch case 30 housing the clutch switch 32 and the cruise cancel switch 34 smaller. As a result, in the present embodiment, it is possible to sense abnormalities in the clutch switch 32 and/or the cruise cancel switch 34 with a simple and inexpensive structure while also reducing the number of components of the motorcycle 10, and also to realize control (HSA control, idle stop control) for at least two different operations in the motorcycle 10 based on the clutch manipulation signal Sa and the cruise cancel signal Sb.

Furthermore, when the driver of the motorcycle 10 manipulates the clutch lever 26, during normal operation, the cruise cancel signal Sb (ON signal indicating the ON state) is output from the cruise cancel switch 34 in response to a small manipulation amount, and after this the clutch manipulation signal Sa (ON signal indicating the ON state) is output from the clutch switch 32 in response to a large manipulation amount.

Therefore, when the clutch lever 26 is manipulated by the driver, if the clutch manipulation signal Sa is output from the clutch switch 32 despite the cruise cancel signal Sb not being output from the cruise cancel switch 34, this is a condition that cannot occur in reality, and therefore the abnormality determining section 66 can reliably determine that an abnormality of the clutch switch 32 remaining in the ON state and/or an abnormality of the cruise cancel switch 34 remaining in the OFF state has occurred.

Furthermore, if the abnormality determining section 66 has determined there is an abnormality in the clutch switch 32, a request is issued to stop the performance of other vehicle control, and therefore it is possible to avoid a feeling of discomfort experienced by the driver when other vehicle control is performed despite there being an abnormality, and also to avoid component malfunction or the like in the motorcycle 10 relating to other vehicle control.

Specifically, if the abnormality determining section 66 has determined there is an abnormality in the clutch switch 32, a request is issued by the vehicle control permission determining section 72 to stop the performance of HSA control or idle stop control, which are controls for at least two different types of operations in the motorcycle 10.

Due to this, it is possible to perform or prohibit three controls (auto cruise control, HSA control, and idle stop control) with just two switches, i.e. the clutch switch 32 and the cruise cancel switch 34. As a result, there is no need to provide a new switch for determining malfunctions in the clutch switch 32 and the cruise cancel switch 34, and therefore the number of components can be reduced.

Furthermore, since there is no need for a switch for determining malfunctions in the clutch switch 32 and the cruise cancel switch 34, the arrangement of the harness around the handle 14 becomes simple, and it is possible to make the switch case 30 even smaller. As a result, it is possible to sense an abnormality in the clutch switch 32 and/or the cruise cancel switch 34 with a simple and inexpensive structure, while reducing the number of components.

Furthermore, in the case of HSA control, for example, it is possible to prevent a delay in the release of the brake from when the motorcycle 10 starts moving. As a result, it is possible to make the motorcycle 10 start moving on a slope without causing a feeling of discomfort in the driver, and to prevent malfunctioning of the brake. As another example, in the case of idle stop control, it is possible to prevent continuous stopping of the engine.

While the preferred embodiments of the present invention have been described above, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention. In addition, in order to facilitate understanding of the present invention, reference numerals in parentheses written in the claims are added in accordance with the reference numerals in the accompanying drawings, but the present invention is not to be interpreted as being limited to these elements with the added reference numerals.

LIST OF REFERENCE NUMERALS

10: motorcycle
12: front wheel
14: handle
16L, 16R: handle bars
18L, 18R: handle grip
20L, 20R: handle switch
22: front wheel brake lever
24: reserve tank
26: clutch lever
28: clutch master cylinder
30: switch case
32: clutch switch (first switch)
34: cruise cancel switch (second switch, auto cruise switch)
38: clutch push button
40: cable
42: cruise cancel push button
46: plate
46a: base end portion
46b: first protruding portion
46c: second protruding portion
48: screw member
50: nut
52: axis
54: gear position sensor
56: ECU
58: injector
60: starter motor
62: fuel pump
64: ignition apparatus
66: abnormality determining section
68: in-gear startup permission determining section
70: auto cruise cancel determining section
72: vehicle control permission determining section
74: startup control section 74
76: cruise control section 76
Sa: clutch manipulation signal (first signal)
Sb: cruise cancel signal (second signal)
Sc: gear position signal

What is claimed is:

1. A vehicle comprising a handle that steers a front wheel, handle grips provided at left and right ends of the handle, a clutch lever that is for manipulating a clutch and arranged in front of one of the handle grips, and a first switch and a second switch that are pressed due to manipulation of the clutch lever, wherein the first switch is a clutch switch that senses manipulation of the clutch lever and the clutch switch outputs a clutch manipulation signal caused by manipulation of the clutch lever, the second switch is an auto cruise switch for cancelling auto cruise control that keeps a travelling speed constant and the auto cruise switch outputs a cancel signal caused by manipulation of the clutch lever, a manipulation amount of the clutch lever necessary for the auto cruise switch to output the cancel signal is less than a manipulation amount of the clutch lever necessary for the clutch switch to output the clutch manipulation signal, the vehicle further comprises an ECU that controls at least two different operations, based on the clutch manipulation signal and the cancel signal, and the ECU includes an abnormality determining section that determines whether there is an abnormality in the clutch switch and/or the auto cruise switch, based on the clutch manipulation signal and the cancel signal, the abnormality determining section determines that there is an abnormality of the clutch switch continuing in an ON state and/or an abnormality of the auto cruise switch continuing in an OFF state, when the clutch switch is in the ON state in which the clutch switch outputs the clutch manipulation signal and the auto cruise switch is in the OFF state in which the auto cruise switch does not output the cancel signal.

2. The vehicle according to claim 1, wherein the ECU further includes:

a startup control section that performs startup control of the vehicle based on the clutch manipulation signal and a gear position of the vehicle;

an auto cruise control section that executes or dissolves the auto cruise control based on whether the cancel signal is input; and a vehicle control permission determining section that issues a request to stop performance of other control to the vehicle, if the abnormality determining section has determined that there is an abnormality in the clutch switch.

3. The vehicle according to claim 2, wherein the vehicle control permission determining section issues a request to stop performance of hill start assist control or idle stop control to the vehicle, if the abnormality determining section has determined that there is an abnormality in the clutch switch.

\* \* \* \* \*